(12) United States Patent
Miyamoto et al.

(10) Patent No.: US 11,342,783 B2
(45) Date of Patent: May 24, 2022

(54) SOLAR CONTROL DEVICE

(71) Applicant: TOYOTA JIDOSHA KABUSHIKI KAISHA, Toyota (JP)

(72) Inventors: Yuma Miyamoto, Toyota (JP); Koichi Go, Aichi-gun (JP); Takashi Nakado, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 15/929,222

(22) Filed: Feb. 11, 2020

(65) Prior Publication Data

US 2020/0280207 A1 Sep. 3, 2020

(30) Foreign Application Priority Data

Mar. 1, 2019 (JP) .............................. JP2019-037665

(51) Int. Cl.
*H02J 7/35* (2006.01)
*H02J 7/00* (2006.01)
*H02J 3/38* (2006.01)

(52) U.S. Cl.
CPC ................ *H02J 7/35* (2013.01); *H02J 3/381* (2013.01); *H02J 7/0048* (2020.01); *H02J 2300/26* (2020.01)

(58) Field of Classification Search
CPC ........... H02J 7/35; H02J 3/381; H02J 2300/26
See application file for complete search history.

(56) References Cited

U.S. PATENT DOCUMENTS

| 2010/0001587 A1* | 1/2010 | Casey | H02S 40/32 |
| | | | 136/244 |
| 2013/0257155 A1* | 10/2013 | Judkins | H02J 3/385 |
| | | | 307/43 |

FOREIGN PATENT DOCUMENTS

| DE | 10 2010 036 966 A1 | 2/2012 |
| JP | 2012-181575 A | 9/2012 |
| JP | 2014-67258 A | 4/2014 |
| JP | 2014-067259 A | 4/2014 |
| JP | 2017-224315 A | 12/2017 |
| JP | 2019-221036 A | 12/2019 |
| WO | WO 2013/147942 A1 | 10/2013 |

* cited by examiner

*Primary Examiner* — David V Henze-Gongola
(74) *Attorney, Agent, or Firm* — Oblon, McClelland, Maier & Neustadt, L.L.P.

(57) ABSTRACT

A solar control device includes: an execution unit configured to cause a DC-DC converter (DDC) to perform a scan process of scanning an output voltage of the solar panel and retrieving a maximum power point based on a predetermined instruction; and a determination unit configured to determine whether a predetermined first time has elapsed after the scan process has been previously completed, to additionally determine whether the panel power continues to be equal to or less than a predetermined first threshold value for a predetermined second time when the first time has elapsed, and to output the instruction to cause the DDC to perform the scan process next to the execution unit when the panel power continues to be equal to or less than the first threshold value for the second time.

5 Claims, 3 Drawing Sheets

SOLAR CONTROL DEVICE

INCORPORATION BY REFERENCE

The disclosure of Japanese Patent Application No. 2019-037665 filed on Mar. 1, 2019 including the specification, drawings and abstract is incorporated herein by reference in its entirety.

BACKGROUND

1. Technical Field

The disclosure relates to a solar control device that is mounted in a vehicle.

2. Description of Related Art

Japanese Patent Application Publication No. 2017-224315 (JP 2017-224315 A) discloses a photovoltaic power generation system that employs a configuration in which a plurality of solar panels is connected in parallel and performs maximum power point tracking (MPPT) control on all the plurality of solar panels. In such a photovoltaic power generation system, even when some of the solar panels are shaded, or the like, and thus a plurality of peaks in a P-V curve is generated, a mode of MPPT control is appropriately changed to track a maximum power point. In general, in MPPT control, when an output voltage of a solar panel changes due to an environmental change such as a change of a state of sunlight, a so-called scan process of scanning output voltages of the solar panels is performed to track a maximum power point with high accuracy, whereby an optimal point in a P-V curve is retrieved.

SUMMARY

Like the photovoltaic power generation system described in JP 2017-224315 A, when MPPT control is performed using a plurality of solar panels as a single large panel, there may be a solar panel that does not track a maximum power point from the viewpoint of individual solar panels, and thus system efficiency may decrease due to such a solar panel.

In this regard, improvement in system efficiency can be expected by independently performing MPPT control on a plurality of solar panels. However, when MPPT control is independently performed on a plurality of solar panels and a system structure in which electric power generated by the respective solar panels is stored in the same battery is employed, a temporary decrease in a battery voltage due to the scan process which is performed on one solar panel affects other solar panels and the temporary decrease in a battery voltage may be erroneously determined to be a time at which the scan process is to be performed, whereby the scan process may be performed on other solar panels at an unexpected erroneous time. Since the scan process which is performed at an erroneous time can be considered to decrease accuracy of MPPT control, a plurality of scan processes can be preferably performed without overlapping as little as possible for the purpose of improvement in accuracy.

The disclosure provides a solar control device that can reduce overlap of execution periods of a plurality of scan processes which is performed on solar panels.

According to an aspect of the disclosure, there is provided a solar control device that is included in each of a plurality of panel control units, in a system in which the plurality of panel control units each including a solar panel and a DC-DC converter is connected to one battery for storage, and controls the DC-DC converter such that electric power generated by the solar panel is controlled using a maximum power point tracking method. The solar control device includes: an execution unit configured to cause the DC-DC converter to perform a scan process of scanning an output voltage of the solar panel and retrieving a maximum power point based on a predetermined instruction; and a determination unit configured to determine whether a predetermined first time has elapsed after the scan process has been previously completed, to additionally determine whether the electric power generated by the solar panel continues to be equal to or less than a predetermined first threshold value for a predetermined second time when it is determined that the first time has elapsed after the scan process has been previously completed, and to output the instruction to cause the DC-DC converter to perform the next scan process to the execution unit when it is determined that the electric power generated by the solar panel continues to be equal to or less than the first threshold value for the second time.

With the solar control device according to the disclosure, it is possible to reduce overlap of execution periods of a plurality of scan processes which is performed on solar panels.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A solar control device according to the disclosure is applied to an onboard solar system in which a plurality of solar panels is provided in parallel, and is provided for each solar panel. In this solar control device, when a solar panel which is controlled by the solar control device satisfies conditions for performing a scan process of MPPT control, the scan process on the solar panel is not immediately performed, but it is determined whether the scan process is to be performed after a predetermined time has elapsed, and then only necessary scan processes are performed. Accordingly, it is possible to reduce overlap of execution periods of a plurality of scan processes which is performed on the solar panels.

Embodiment

An embodiment will be described below in detail with reference to the accompanying drawings.

Configuration

Figure 1:
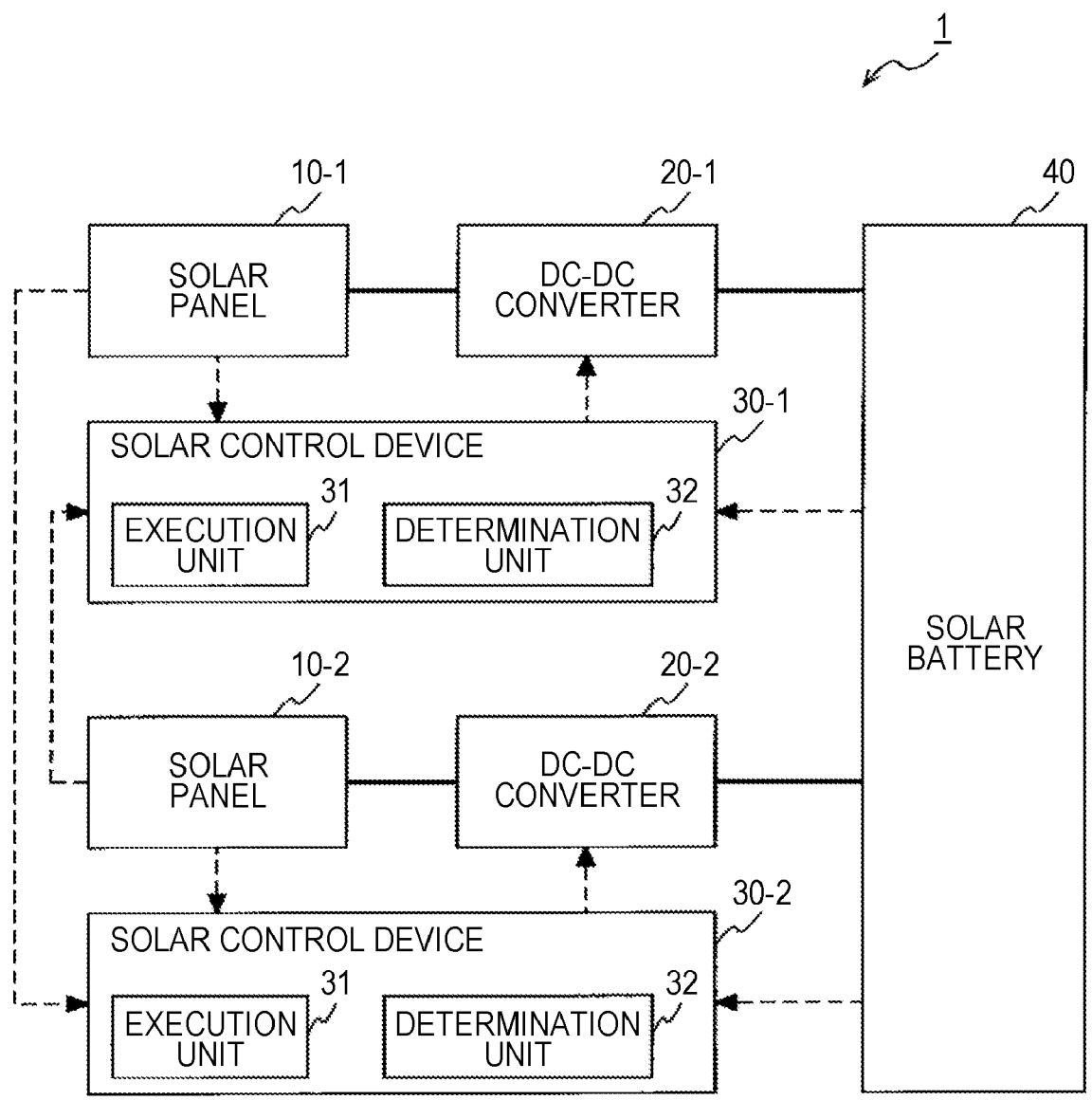
FIG. 1 is a block diagram illustrating an example of a configuration of an onboard solar system including a solar control device according to an embodiment.

FIG. 1 is a block diagram illustrating an example of a configuration of an onboard solar system 1 including a solar control device 30 according to an embodiment. The onboard solar system 1 illustrated in FIG. 1 includes a plurality of solar panels 10 (10-1 and 10-2), a plurality of DC-DC converters 20 (20-1 and 20-2), a plurality of solar control devices 30 (30-1 and 30-2), and a solar battery 40. One panel control unit is constituted by the solar panel 10-1, the DC-DC converter 20-1, and the solar control device 30-1, and one panel control unit is constituted by the solar panel 10-2, the DC-DC converter 20-2, and the solar control device 30-2. In FIG. 1, two panel control units are provided in parallel, but three or more panel control units may be provided in parallel. In FIG. 1, power (voltage, current) lines are represented by solid lines, and signal lines associated with control are represented by dotted lines.

Each of the plurality of solar panels 10 is a solar cell module that receives radiation of sunlight and generates electric power. The solar panel 10-1 is connected to the DC-DC converter 20-1, and electric power generated by the solar panel 10-1 is output to the DC-DC converter 20-1. The solar panel 10-2 is connected to the DC-DC converter 20-2, and electric power generated by the solar panel 10-2 is output to the DC-DC converter 20-2. The plurality of solar panels 10 may be equal to each other in performance, capacity, dimension, and size or may be different from each other in some or all thereof.

The plurality of DC-DC converters 20 is provided to correspond to the plurality of solar panels 10 and is configured to independently control electric power generated by the plurality of solar panels 10. More specifically, the DC-DC converter 20-1 can step up and/or step down an input voltage to a predetermined output voltage under the control of the solar control device 30-1, and set an operating point of the solar panel 10-1 such that power generation efficiency is normally maximized using MPPT control based on a hill-climbing method. The DC-DC converter 20-2 can step up and/or step down an input voltage to a predetermined output voltage under the control of the solar control device 30-2, and set an operating point of the solar panel 10-2 such that power generation efficiency is normally maximized using MPPT control based on a hill-climbing method. The MPPT control based on a hill-climbing method is a known technique and thus will not be described in this embodiment.

The solar battery 40 is a secondary storage battery which is configured to be chargeable and dischargeable such as a lithium-ion battery or a nickel-hydride battery. The solar battery 40 is connected to the plurality of DC-DC converters 20 and is configured to be charged with electric power generated by the solar panel 10-1 via the DC-DC converter 20-1 and to be charged with electric power generated by the solar panel 10-2 via the DC-DC converter 20-2.

Each solar control device 30 can control the corresponding DC-DC converter 20 such that electric power generated by the corresponding solar panel 10 is controlled. Specifically, the solar control device 30-1 acquires information such as a voltage and a current generated in the plurality of solar panels 10 or a terminal voltage and an input/output current of the solar battery 40 from a voltage sensor, a current sensor, or the like which is not illustrated, and appropriately controls a voltage instruction value which is supplied to the DC-DC converter 20-1 which is a control object based on the acquired information. The solar control device 30-2 acquires information such as a voltage and a current generated in the plurality of solar panels 10 or a terminal voltage and an input/output current of the solar battery 40 from a voltage sensor, a current sensor, or the like which is not illustrated, and appropriately controls a voltage instruction value which is supplied to the DC-DC converter 20-2 which is a control object based on the acquired information. The information which is acquired by the solar control devices 30-1 and 30-2 may include a state of charge (SOC) or an internal resistance value of the solar battery 40.

All or some of the solar control devices 30 can be typically configured as an electronic control unit (ECU) including a processor, a memory, and an input and output interface. In the electronic control unit, the functions of an execution unit 31 and a determination unit 32 which will be described below are realized by causing the processor to read and execute a program which is stored in the memory.

The execution unit 31 causes the DC-DC converter 20 which is a control object (hereinafter referred to as a "corresponding DC-DC converter 20") to perform a scan process on the solar panel 10 which is a control object (hereinafter referred to as a "corresponding solar panel 10") based on an instruction to execute a predetermined scan which is supplied from the determination unit 32 which will be described later. A scan process is a process of scanning an output voltage of the solar panel 10 and retrieving a maximum power point. Specifically, a scan process includes measuring an output current while changing an output voltage of the solar panel 10 from a high voltage side to a low voltage side and calculating an output voltage of the solar panel 10 at which a maximum power is acquired based on I-V characteristics which are obtained from the measurement.

The determination unit 32 determines whether or not a scan process on the corresponding solar panel 10 by the corresponding DC-DC converter 20 is currently being performed. More specifically, the determination unit 32 determines whether a time having elapsed (hereinafter referred to as an "elapsed time T1") after a previous scan process on the corresponding solar panel 10 was completed is equal to or greater than a predetermined time (hereinafter referred to as a "first time α"). The first time α will be described later.

When it is determined that a scan process on the corresponding solar panel 10 is not currently being performed, the determination unit 32 determines whether the corresponding solar panel 10 is in a state in which it cannot generate sufficient electric power. More specifically, the determination unit 32 determines whether a state in which electric power generated by the corresponding solar panel 10 (generated electric power P) is equal to or less than a predetermined value (hereinafter referred to as a "first threshold value β") is maintained for a predetermined period (hereinafter referred to as a "second time γ"). The first threshold value β and the second time γ will be described later.

When it is determined that a scan process on the corresponding solar panel 10 is not currently being performed, the determination unit 32 can determine whether a scan process is being performed by a DC-DC converter 20 other than the corresponding DC-DC converter 20 (hereinafter referred to as a "non-corresponding DC-DC converter 20"). More specifically, the determination unit 32 detects a rapid change in the output voltage of the solar panel 10 which accompanies the scan process by determining whether an absolute value of a change ΔV in a predetermined period t of the output voltage of another solar panel 10 (hereinafter referred to as a "non-corresponding solar panel 10") which is controlled by the non-corresponding DC-DC converter 20 is equal to or greater than a predetermined value (hereinafter referred to as a "second threshold value δ"). The predetermined period t, the change ΔV, and the second threshold value δ will be described later.

When it is determined that the predetermined time (the first time α) has elapsed after the previous scan process was completed and the generated electric power P of the non-corresponding solar panel 10 continues to be equal to or less than a predetermined power (the first threshold value β) for the predetermined time (the second time γ), the determination unit 32 can output an instruction to cause the non-corresponding DC-DC converter 20 to perform a next scan process on the next non-corresponding solar panel 10 to the execution unit 31.

Problem in Parallel Configuration

A problem of a configuration in which a plurality of panel control units (sets of the solar panel 10 and the DC-DC converter 20) are provided in parallel will be described below with reference to FIG. 1 before describing scan process control which is performed by the solar control device 30 according to this embodiment.

In MPPT control, a primary-side voltage of the DC-DC converter 20 (a voltage on the solar panel 10 side) which is used for the control is determined based on a secondary-side voltage of the DC-DC converter 20 (a voltage on the solar battery 40 side). For example, when the DC-DC converter 20-1 performs a scan process on the solar panel 10-1, the secondary-side voltage of the DC-DC converter 20-1 changes greatly due to scanning. This change directly affects the secondary-side voltage of the DC-DC converter 20-2 which does not perform a scan process. Accordingly, in a period in which control with a low voltage is performed by the DC-DC converter 20-1, there is concern that the DC-DC converter 20-2 may recognize that an operation voltage of the solar panel 10-2 departs from a maximum power point (MPP) and the generated electric power of the solar panel 10-2 decreases, and may start a scan process on the solar panel 10-2 by itself due to an influence of the scan process on the solar panel 10-1. However, in the scan process which is performed at that time, accuracy of MPPT control of the DC-DC converter 20-2 decreases.

Therefore, in this embodiment, scan process control which will be described below is performed to reduce opportunities for overlap between a scan process on a corresponding solar panel and a scan process on a non-corresponding solar panel such that accuracy of MPPT control is improved.

Control

Figure 2:
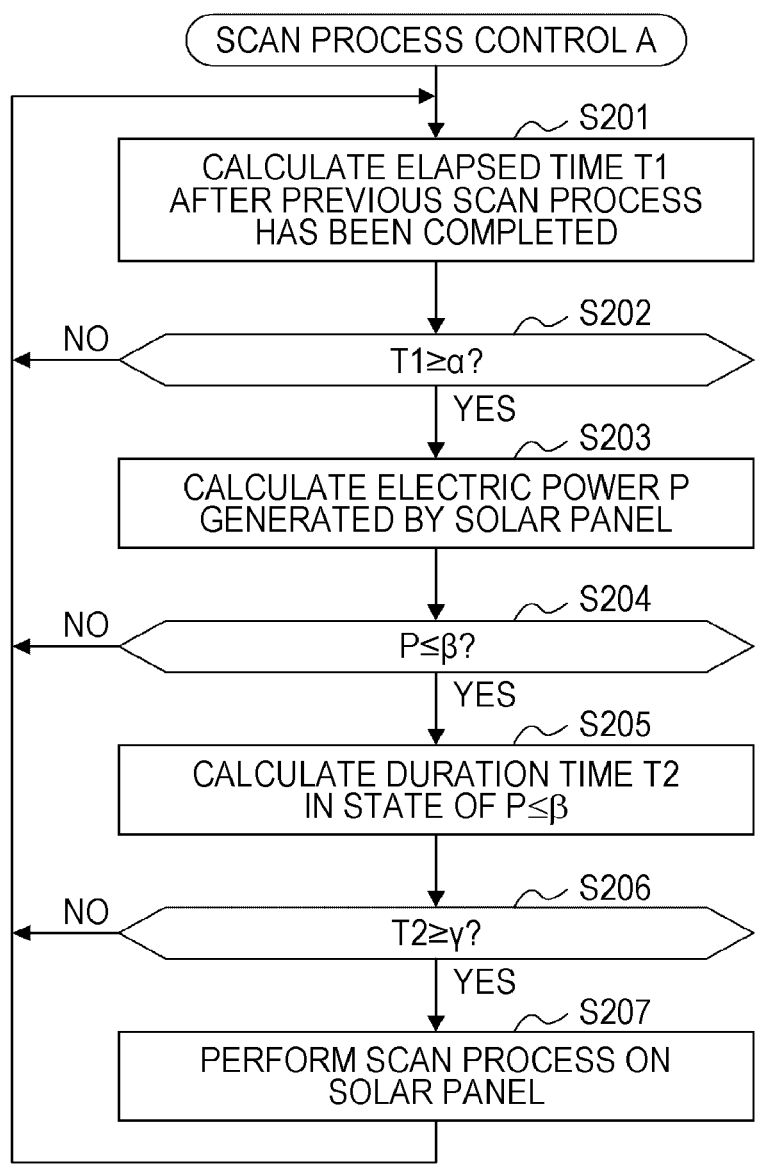
FIG. 2 is a flowchart illustrating a process flow of scan process control A which is performed by the solar control device.
Figure 3:
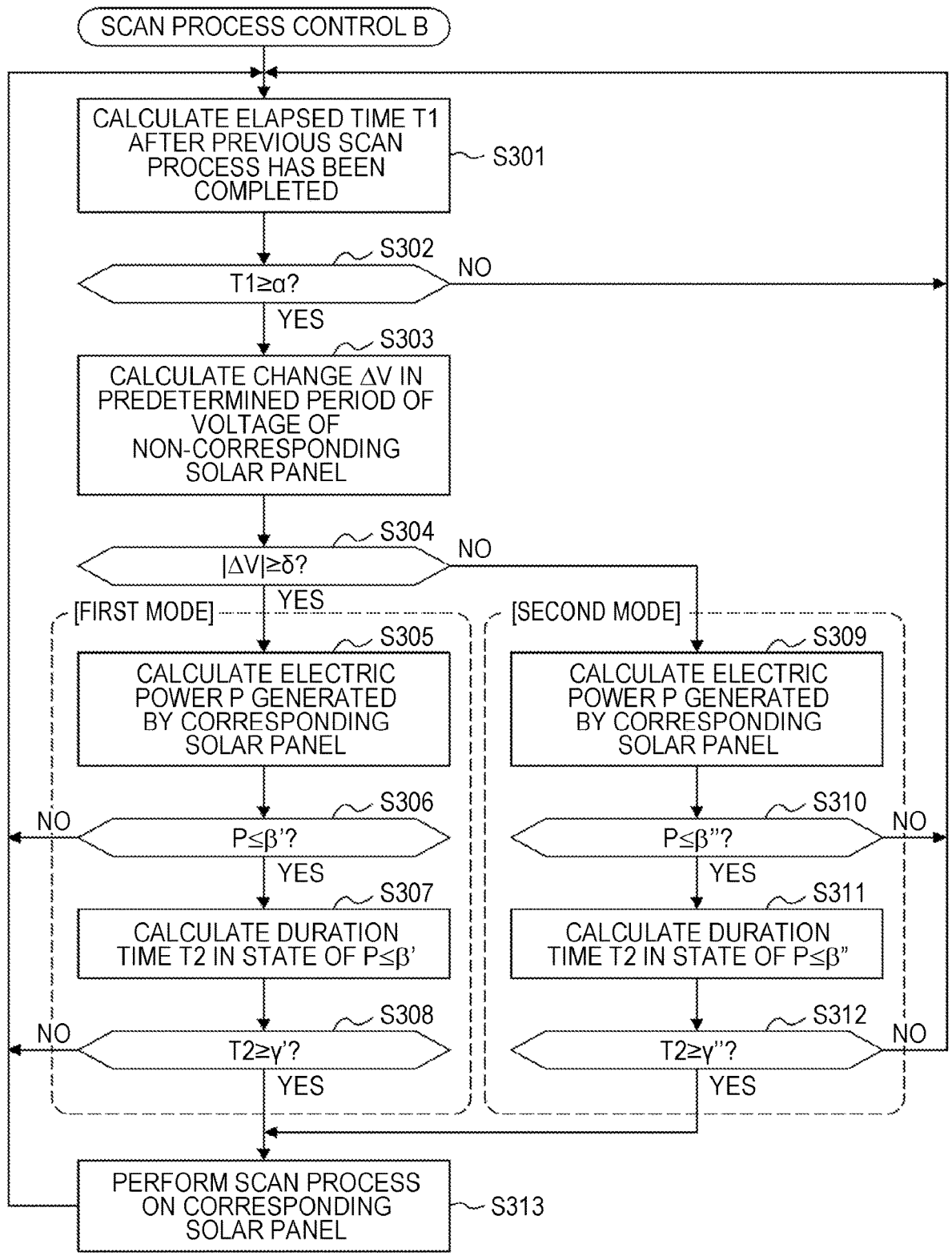
FIG. 3 is a flowchart illustrating a process flow of scan process control B which is performed by the solar control device.

Control which is performed by the solar control device 30 according to an embodiment will be described below with additional reference to FIGS. 2 and 3. FIG. 2 is a flowchart illustrating a routine of scan process control A which is performed by a plurality of solar control devices 30 (30-1 and 30-2). FIG. 3 is a flowchart illustrating a routine of other scan process control B which is performed by a plurality of solar control devices 30 (30-1 and 30-2).

(1) Scan Process Control A

Scan process control A illustrated in FIG. 2 is started, for example, when the onboard solar system 1 starts, and is repeatedly performed until the onboard solar system 1 stops.

Step S201: The determination unit 32 calculates an elapsed time T1 after a previous scan process on a corresponding solar panel 10 has been completed for a corresponding DC-DC converter 20. When a scan process has not been performed at all immediately after the onboard solar system 1 has been started, a time having elapsed after the onboard solar system 1 has been started can be calculated as the elapsed time T1. When the elapsed time T1 is calculated, the routine progresses to Step S202.

Step S202: The determination unit 32 determines whether the elapsed time T1 calculated in Step S201 is equal to or greater than the first time α (T1≥α). The first time α is appropriately set based on a time in which the onboard solar system 1 can continue to permit a state in which power generation efficiency of the solar panel 10 decreases to a certain extent, or the like. The first time α may have the same value in a plurality of DC-DC converters 20 (20-1 and 20-2) or have different values. The routine progresses to Step S203 when T1≥α is satisfied (YES in Step S202), and the routine progresses to Step S201 when T1≥α is not satisfied (NO in Step S202).

Step S203: The determination unit 32 calculates generated electric power P of the corresponding solar panel 10. The generated electric power P can be calculated based on a voltage and a current of the corresponding solar panel 10, or the like. When the generated electric power P is calculated, the routine progresses to Step S204.

Step S204: The determination unit 32 determines whether the generated electric power P of the corresponding solar panel 10 calculated in Step S203 is equal to or less than the first threshold value β (P≤β). The first threshold value β is a reference for determining whether the solar panel 10 satisfactorily generates electric power and is appropriately set based on a rated value (a maximum generated power) or an insolation state of the solar panel 10 or the like. The first threshold value β may have the same value in a plurality of solar panels 10 (10-1 and 10-2) or may have different values. The routine progresses to Step S205 when P≤β is satisfied (YES in Step S204), and the routine progresses to Step S201 when P≤β is not satisfied (NO in Step S204).

Step S205: The determination unit 32 calculates a time (a duration time T2) in which a state in which the generated electric power P of the corresponding solar panel 10 is equal to or less than the first threshold value β is maintained. A start point of the duration time T2 can be set to a time point at which it is determined in Step S204 that P≤β is satisfied. When the duration time T2 is calculated, the routine progresses to Step S206.

Step S206: The determination unit 32 determines whether the duration time T2 of the state in which P≤β is satisfied which is calculated in Step S205 is equal to or greater than the second time γ (T2≥γ). The second time γ is a time which is provided for the corresponding DC-DC converter 20 such that a temporary decrease in voltage of the solar battery 40 due to a scan process which is estimated to be performed by a non-corresponding DC-DC converter 20 is less likely to affect another, and is set to be longer than a time which is estimated to be required until a scan process by a non-corresponding DC-DC converter 20 is completed, more specifically, a time which is estimated to be required until the secondary-side (the solar battery 40 side) voltage of the corresponding DC-DC converter 20 changing with the scan process is satisfactorily stabilized. The second time γ may have the same value in a plurality of DC-DC converters 20 (20-1 and 20-2) or may have different values. The routine progresses to Step S207 when T2≥γ is satisfied (YES in Step S206), and the routine progresses to Step S201 when T2≥γ is not satisfied (NO in Step S206).

Step S207: The execution unit 31 causes the corresponding DC-DC converter 20 to perform a scan process on the corresponding solar panel 10. When a scan process is performed by the corresponding DC-DC converter 20, the routine returns to Step S201.

According to scan process control A, in a configuration in which a plurality of solar panels is connected in parallel, it is conceivable that a scan process is being performed on another non-corresponding solar panel 10 when electric power generated by the corresponding solar panel 10 which is a control object thereof is not satisfactory. Accordingly, after a time which is estimated to be required until the scan process on the non-corresponding solar panel 10 is completed has elapsed, it is determined whether a scan process is to be performed on the corresponding solar panel 10. Accordingly, it is possible to reduce opportunities to overlap a scan process on a corresponding solar panel with a scan process on a non-corresponding solar panel.

(2) Scan Process Control B

Scan process control B illustrated in FIG. 3 is alternative control for scan process control A and accuracy of determination of whether a scan process is to be performed is further improved than that in scan process control A illustrated in FIG. 2. Scan process control B is started, for example, when the onboard solar system 1 starts, and is repeatedly performed until the onboard solar system 1 stops.

Step S301: The determination unit 32 calculates an elapsed time T1 after a previous scan process on a corresponding solar panel 10 has been completed for a corresponding DC-DC converter 20. When a scan process has not been performed at all immediately after the onboard solar system 1 has been started, a time having elapsed after the onboard solar system 1 has been started can be calculated as the elapsed time T1. When the elapsed time T1 is calculated, the routine progresses to Step S302.

Step S302: The determination unit 32 determines whether the elapsed time T1 after the previous scan process has been completed is equal to or greater than the first time $\alpha$ (T1≥$\alpha$). The first time $\alpha$ is the same as described above. The routine progresses to Step S303 when T1≥$\alpha$ is satisfied (YES in Step S302), and the routine progresses to Step S301 when T1≥$\alpha$ is not satisfied (NO in Step S302).

Step S303: The determination unit 32 calculates a change $\Delta V$ in a predetermined period t of the output voltage of a non-corresponding solar panel 10 for each non-corresponding solar panel 10 which is controlled by the non-corresponding DC-DC converter 20. For example, the change $\Delta V$ (=Vs−Vs') is calculated by subtracting the output voltage Vs' of the non-corresponding solar panel 10 at time [X+t] from the output voltage Vs of the non-corresponding solar panel 10 at time [X]. The predetermined time t is appropriately set in consideration of a range or a period of a change in output voltage of a solar panel 10 which accompanies a scan process performed in MPPT control. When the change $\Delta V$ is calculated, the routine progresses to Step S304.

Step S304: The determination unit 32 determines whether an absolute value of the change $\Delta V$ in the predetermined period t of the output voltage of the non-corresponding solar panel 10 is equal to or greater than the second threshold value $\delta$ (|$\Delta V$|≥$\delta$). When the absolute value of the change $\Delta V$ is equal to or greater than the second threshold value $\delta$ (|$\Delta V$|≥$\delta$), the determination unit 32 can determine that the output voltage of the non-corresponding solar panel 10 changes (decreases) rapidly and estimate that a scan process is being performed by the non-corresponding DC-DC converter 20. The second threshold value $\delta$ is appropriately set in consideration of a range or a period of a change in output voltage of a solar panel 10 which accompanies a scan process performed in MPPT control. When |$\Delta V$|≥$\delta$ is satisfied (YES in Step S304), it is estimated that a scan process is being performed by the non-corresponding DC-DC converter 20 and the routine progresses to Step S305 (a first mode). When |$\Delta V$|≥$\delta$ is not satisfied (NO in Step S304), it is estimated that a scan process is not being performed by the non-corresponding DC-DC converter 20 and the routine progresses to Step S309 (a second mode).

In Steps S303 and S304, a terminal voltage of the solar battery 40 may be used instead of the output voltage of the solar panel 10. That is, by calculating a change $\Delta V$ in the predetermined period t of the terminal voltage of the solar battery 40 in Step S303 and determining whether the absolute value of the change $\Delta V$ is equal to or greater than the second threshold value $\delta$ in Step S304, it is possible to estimate that a scan process is being performed by any non-corresponding DC-DC converter 20.

Step S305: In the first mode, the determination unit 32 calculates a generated electric power P of a corresponding solar panel 10 which is controlled by a corresponding DC-DC converter 20. The generated electric power P can be calculated based on a voltage and a current of the corresponding solar panel 10 or the like. When the generated electric power P is calculated, the routine progresses to Step S306.

Step S306: The determination unit 32 determines whether the generated electric power P of the corresponding solar panel 10 is equal to or less than a first threshold value $\beta'$ (P≤$\beta'$). The first threshold value $\beta'$ is a reference for determining whether the solar panel 10 satisfactorily generates electric power and is appropriately set based on a rated value (a maximum generated power) or an insolation state of the solar panel 10 or the like. The first threshold value $\beta'$ may have the same value in a plurality of solar panels 10 (10-1 and 10-2) or may have different values. By setting the first threshold value $\beta'$ to be less than a first threshold value $\beta''$ in the second mode which will be described later, it is possible to make execution conditions of a scan process stricter than those in the second mode and to delay a time at which the corresponding DC-DC converter 20 can perform a scan process. The routine progresses to Step S307 when P≤$\beta'$ is satisfied (YES in Step S306), and the routine progresses to Step S301 when P≤$\beta'$ is not satisfied (NO in Step S306).

Step S307: The determination unit 32 calculates a time (a duration time T2) in which a state in which the generated electric power P of the corresponding solar panel 10 is equal to or less than the first threshold value $\beta'$ (P≤$\beta'$) is maintained. A start point of the duration time T2 can be set to a time point at which it is determined in Step S306 that P≤$\beta'$ is satisfied. When the duration time T2 is calculated, the routine progresses to Step S308.

Step S308: The determination unit 32 determines whether the duration time T2 of the state in which P≤$\beta'$ is satisfied is equal to or greater than a second time $\gamma'$ (T2≥$\gamma'$). The second time $\gamma'$ is a time by which a time at which the corresponding DC-DC converter 20 performs a scan process is delayed and a time which is provided such that a temporary decrease in voltage of the solar battery 40 due to a scan process which is estimated to be performed by a non-corresponding DC-DC converter 20 can be made to have difficulty in affecting another. In this embodiment, the second time $\gamma'$ is set to be longer than a second time $\gamma''$ such that the waiting time in the first mode is longer than the waiting time in the second mode. The routine progresses to Step S313 when T2≥$\gamma'$ is satisfied (YES in Step S308), and the routine progresses to Step S301 when T2≥$\gamma'$ is not satisfied (NO in Step S308).

Step S309: In the second mode, the determination unit 32 calculates a generated electric power P of a corresponding solar panel 10 which is controlled by a corresponding DC-DC converter 20. The generated electric power P can be calculated based on a voltage and a current of the corresponding solar panel 10 or the like. When the generated electric power P is calculated, the routine progresses to Step S310.

Step S310: The determination unit 32 determines whether the generated electric power P of the corresponding solar panel 10 is equal to or less than a first threshold value $\beta''$ ($P \leq \beta''$). The first threshold value $\beta''$ is a reference for determining whether the solar panel 10 satisfactorily generates electric power and is appropriately set based on a rated value (a maximum generated power) or an insolation state of the solar panel 10 or the like. The first threshold value $\beta''$ may have the same value in a plurality of solar panels 10 (10-1 and 10-2) or may have different values. By setting the first threshold value $\beta''$ to be greater than a first threshold value $\beta'$, it is possible to relax execution conditions of a scan process more than those in the first mode. Typically, the first threshold value $\beta''$ which is used for scan process control B is set to be equal to the first threshold value $\beta$ which is used for scan process control A. The routine progresses to Step S311 when $P \leq \beta''$ is satisfied (YES in Step S310), and the routine progresses to Step S301 when $P \leq \beta''$ is not satisfied (NO in Step S310).

Step S311: The determination unit 32 calculates a time (a duration time T2) in which a state in which the generated electric power P of the corresponding solar panel 10 is equal to or less than the first threshold value $\beta''$ ($P \leq \beta''$) is maintained. A start point of the duration time T2 can be set to a time point at which it is determined in Step S310 that $P \leq \beta''$ is satisfied. When the duration time T2 is calculated, the routine progresses to Step S312.

Step S312: The determination unit 32 determines whether the duration time T2 of the state in which $P \leq \beta''$ is satisfied is equal to or greater than a second time $\gamma''$ ($T2 \geq \gamma''$). The second time $\gamma''$ is a time by which a time at which the corresponding DC-DC converter 20 performs a scan process is delayed and a time which is provided such that a temporary decrease in voltage of the solar battery 40 due to a scan process which is estimated to be performed by a non-corresponding DC-DC converter 20 can be made to have difficulty in affecting another. In this embodiment, the second time $\gamma''$ is set to be shorter than the second time $\gamma'$ in the first mode such that a scan process can be rapidly performed by the corresponding DC-DC converter 20 when it is estimated that a scan process is not being performed by the non-corresponding DC-DC converter 20. The routine progresses to Step S313 when $T2 \geq \gamma''$ is satisfied (YES in Step S312), and the routine progresses to Step S301 when $T2 \geq \gamma''$ is not satisfied (NO in Step S312).

Step S313: The execution unit 31 causes the corresponding DC-DC converter 20 to perform a scan process on the corresponding solar panel 10. When a scan process is performed by the corresponding DC-DC converter 20, the routine returns to Step S301.

With scan process control B, in addition to the determination in scan process control A, it is accurately estimated whether a scan process is being performed by another non-corresponding solar panel 10, and the first threshold value $\beta'$ for determining the generated electric power P is decreased and the second time $\gamma'$ by which performing of a scan process is waited for is increased when it is estimated that a scan process is being performed (the first mode). Accordingly, in the first mode, it is possible to reduce opportunities to overlap a scan process on a corresponding solar panel which is a control object thereof with a scan process on a non-corresponding solar panel due to an influence of the scan process on the non-corresponding solar panel 10 (a decrease in voltage). On the other hand, in the second mode, it is possible to rapidly perform a scan process on a corresponding solar panel 10.

Operation and Advantages

When a generated electric power P of a solar panel 10 is lower than a predetermined value (a first threshold value $\beta$) at a time point at which a predetermined time (a first time $\alpha$) has elapsed after a previous scan process has been completed in MPPT control, the solar control device 30 according to an embodiment does not start a next scan process immediately, but determines whether a scan process is to be performed after a predetermined time (a second time $\gamma$) has elapsed. Accordingly, since a temporary decrease in voltage of the solar battery 40 due to a scan process which is estimated to be performed by a non-corresponding DC-DC converter 20 can be made to have difficulty in affecting another, it is possible to decrease a likelihood that a scan process on the corresponding solar panel will be performed to overlap a scan process on a non-corresponding solar panel. Accordingly, it is possible to reduce overlap between execution periods of a plurality of scan processes which is performed on the solar panels. In addition, improvement in system efficiency of the onboard solar system 1 as a whole can be expected.

The solar control device 30 according to this embodiment determines whether an absolute value of a change $\Delta V$ in a predetermined period of an output voltage of a non-corresponding solar panel 10 or a terminal voltage of the solar battery 40 is equal to or greater than a predetermined value (a second threshold value $\delta$) at a time point at which a predetermined time (a first time $\alpha$) has elapsed after a previous scan process in MPPT control has been completed, and makes determination (a first threshold value $\beta'$) of a decrease in generated electric power P stricter or makes a waiting time (a second time $\gamma'$) until a scan process is performed longer. Accordingly, it is possible to reduce overlap of execution periods of a plurality of scan processes which is performed on solar panels with higher accuracy.

Here, when the waiting time (the second time $\gamma$, $\gamma'$, or $\gamma''$) until a scan process is performed is set to be longer than a time which is estimated to be required until a scan process on a non-corresponding solar panel 10 is completed, it is possible to reduce overlap of execution periods of a plurality of scan processes which is performed on solar panels.

While an embodiment has been described above, the disclosure can be understood as a solar control device, an onboard solar system including the solar control device, a scan process control method which is performed by the solar control device, a scan process control program, a non-transitory computer-readable recording medium storing the scan process control program, and a vehicle in which the solar control device is mounted.

The solar control device according to the disclosure can be applied to a vehicle in which a plurality of sets of a solar panel and a DC-DC converter is provided in parallel, or the like.

What is claimed is:

1. A solar control device that is included in each of a plurality of panel control units, in a system in which the plurality of panel control units each including a solar panel and a DC-DC converter is connected to one battery for storage, and controls the DC-DC converter such that electric power generated by the solar panel is controlled using a maximum power point tracking method, the solar control device comprising:

an execution unit configured to cause the DC-DC converter to perform a scan process of scanning an output voltage of the solar panel and retrieving a maximum power point based on a predetermined instruction; and a determination unit configured to determine whether a predetermined first time has elapsed after the scan process has been previously completed, to additionally determine whether the electric power generated by the solar panel continues to be equal to or less than a predetermined first threshold value for a predetermined second time when it is determined that the first time has elapsed after the scan process has been previously completed, and to output the instruction to cause the DC-DC converter to perform the next scan process to the execution unit when it is determined that the electric power generated by the solar panel continues to be equal to or less than the first threshold value for the second time.

2. The solar control device according to claim 1, wherein the determination unit is configured to additionally determine whether an absolute value of a change in a predetermined period of an output voltage of another solar panel is equal to or greater than a predetermined second threshold value when it is determined that the first time has elapsed after the scan process has been previously completed, and to decrease the first threshold value and to increase the second time when it is determined that the absolute value of a change in the predetermined period is equal to or greater than the second threshold value in comparison with a case in which the absolute value of a change in the predetermined period is less than the second threshold value.

3. The solar control device according to claim 2, wherein the determination unit is configured to set the second time to be longer than a time which is required from a time point at which it is determined that the absolute value of a change in the predetermined period is less than the second threshold value to a time point at which the scan process on the solar panel is completed by the DC-DC converter in another panel control unit.

4. The solar control device according to claim 1, wherein the determination unit is configured to additionally determine whether an absolute value of a change in a predetermined period of a terminal voltage of the battery is equal to or greater than a predetermined second threshold value when it is determined that the first time has elapsed after the scan process has been previously completed, and to decrease the first threshold value and to increase the second time when it is determined that the absolute value of a change in the predetermined period is equal to or greater than the second threshold value in comparison with a case in which the absolute value of a change in the predetermined period is less than the second threshold value.

5. The solar control device according to claim 4, wherein the determination unit is configured to set the second time to be longer than a time which is required from a time point at which it is determined that the absolute value of a change in the predetermined period is less than the second threshold value to a time point at which the scan process on the solar panel is completed by the DC-DC converter in another panel control unit.

* * * * *